Dec. 5, 1933.  E. R. SMITH ET AL  1,938,050
TOOL SLIDE ACTUATING MECHANISM
Filed Sept. 21, 1931  5 Sheets-Sheet 3
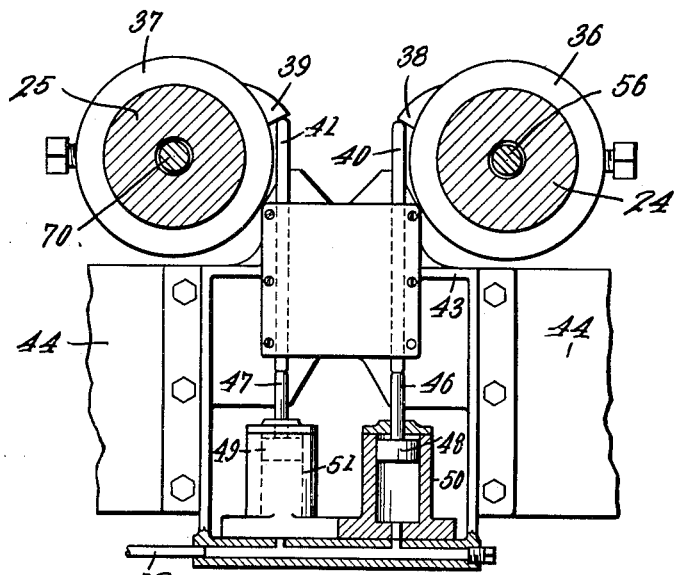
Fig. 3.
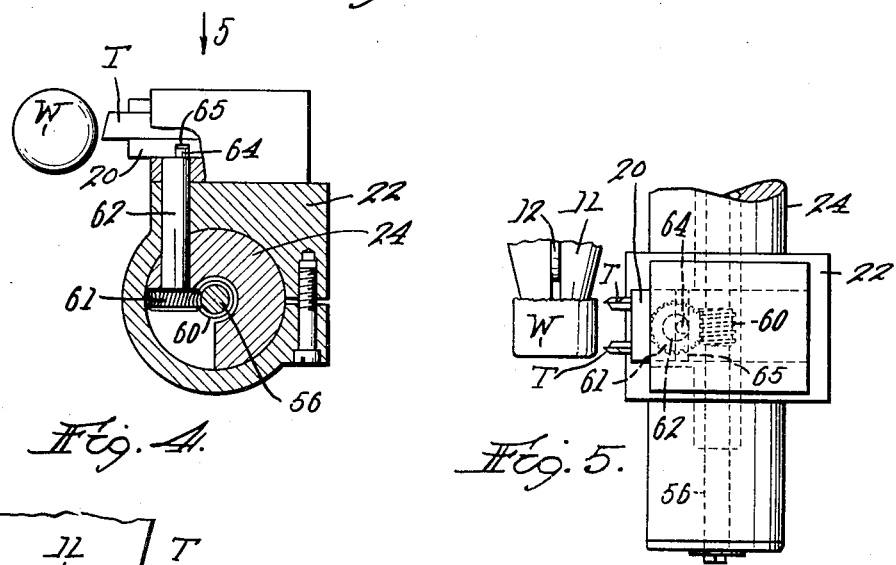
Fig. 4.  Fig. 5.
Fig. 6.
Inventors
Edwin R. Smith
Juel L. Peterson
By Attorneys
Southgate Fray & Hawley

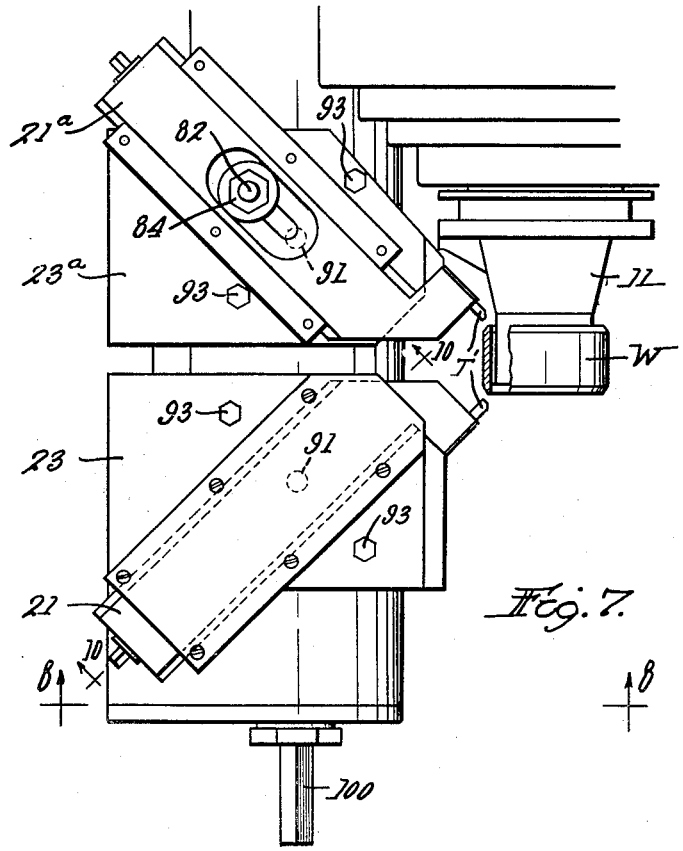
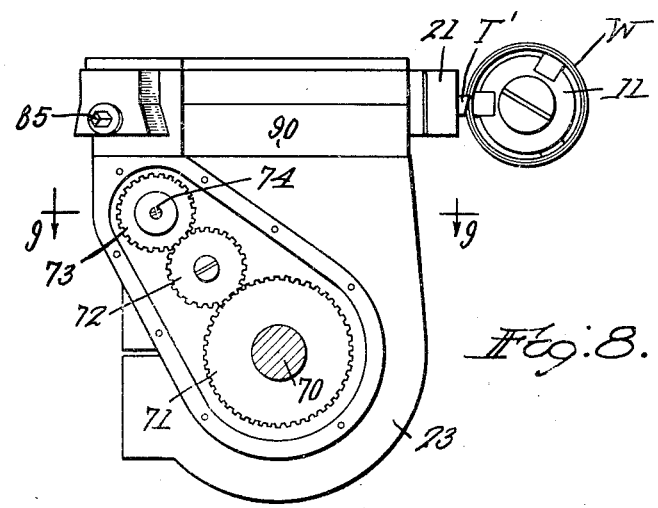

Dec. 5, 1933.  E. R. SMITH ET AL  1,938,050
TOOL SLIDE ACTUATING MECHANISM
Filed Sept. 21, 1931   5 Sheets-Sheet 5

Inventors
Edwin R. Smith
Juel L. Peterson
By Attorneys
Southgate Hayes Hawley

Witness
W. D. McKeon

Patented Dec. 5, 1933

1,938,050

UNITED STATES PATENT OFFICE 1,938,050

TOOL SLIDE ACTUATING MECHANISM

Edwin R. Smith and Juel L. Peterson, Seneca Falls, N. Y., assignors to Seneca Falls Machine Company, Seneca Falls, N. Y., a corporation of Massachusetts Application September 21, 1931
Serial No. 563,969

8 Claims. (Cl. 82—25)

This invention relates to machine tools, such as lathes, in which tools are mounted in slides or holders and are automatically moved toward and away from the work.

It is the general object of our invention to provide means for advancing the tools to working position and for feeding the tools during the cutting operation on the work.

More specifically we provide means for moving the tools quickly to working position and for feeding the tools with a straight line movement while they are operating on the work. By the use of our invention, we are able to combine the advantage of straight line feed of the tools while operating, with the advantage of rapid withdrawal of the tools from working position to permit removal and replacement of the work, and rapid return of the tools to working position after a new piece of work has been inserted.

A further object of the invention is to provide actuating mechanism by which a tool and tool slide may be conveniently fed at any desired angle to the axis on which the work is rotated.

Our invention further relates to arrangements and combinations of parts which will be hereinafter described and more particularly pointed out in the appended claims.

A preferred form of the invention is shown in the drawings, in which

Fig. 3 is a sectional front elevation of certain parts, taken along the line 3—3 in Fig. 2;

Fig. 4 is a sectional front elevation of the mechanism for operating the rear tool slide;

Fig. 5 is a plan view of the same mechanism, looking in the direction of the arrow 5 in Fig. 4;

Fig. 6 is a detail plan view, showing the operation of the tools on the work;

Fig. 7 is a plan view of the front tool slides, with the parts appearing as viewed in the direction of the arrow 7 in Fig. 1;

Fig. 8 is a sectional front elevation, taken along the line 8—8 in Fig. 7;

Figure 2:
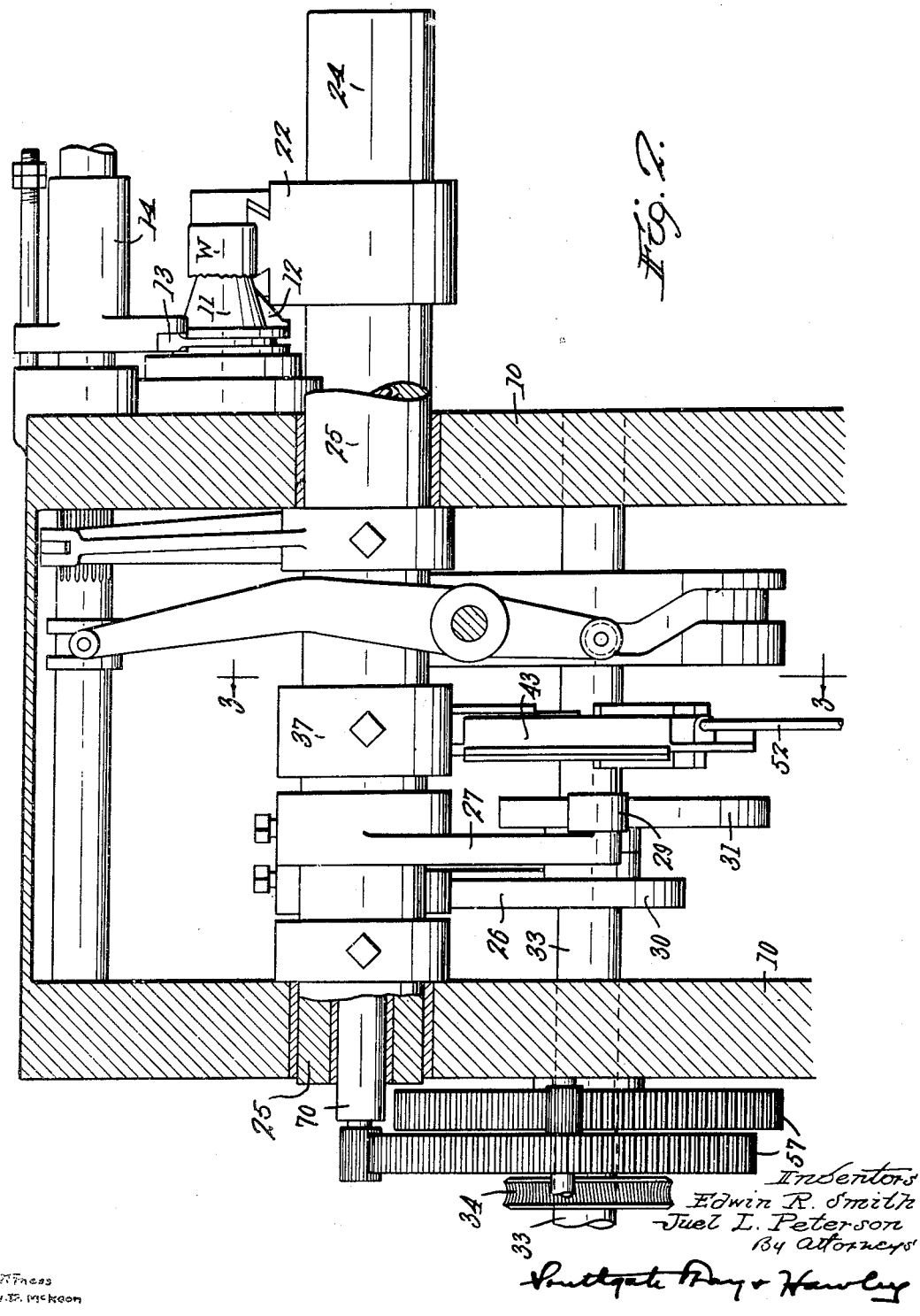
Fig. 2 is a sectional side elevation of the mechanism shown in Fig. 1, taken along the line 2—2 in Fig. 1.
Figure 9:
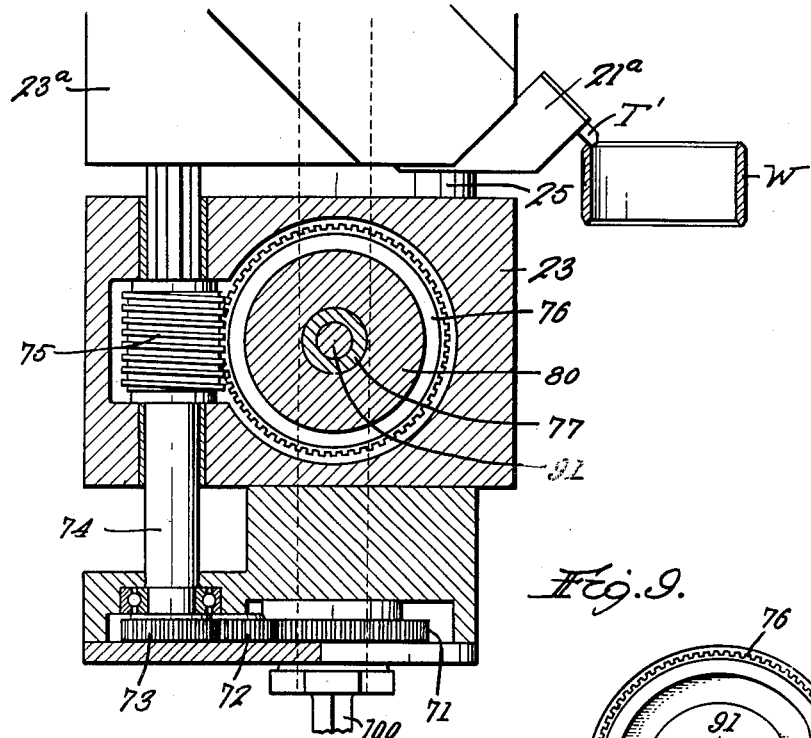
Fig. 9 is a sectional plan view, taken along the line 9—9 in Fig. 8.
Figure 11:
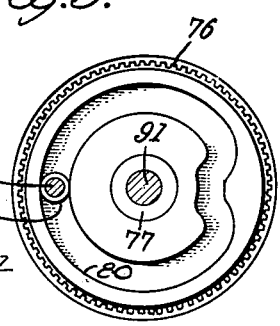
Fig. 11 is a sectional plan view of a cam, taken along the line 11—11 in Fig. 10.

Referring to the drawings, we have shown portions of an automatic lathe including a casing or frame 10 in which a piece of work W is supported on a rotating work driving member 11 (Fig. 2). The work is rotated by any suitable driving means, not shown, and a finished piece of work may be removed from the chuck or work holder by advancing a series of wedge-shaped plows or fingers 12, slidable in grooves in the work driving member 11. These ejecting fingers are engaged by a yoke member 13, mounted on a slide 14 and movable by hydraulic mechanism, not shown, after the completion of the operations on each piece of work.

The machine to which our invention is applied may be provided with suitable work-loading, work-driving and work-ejecting mechanism but such mechanism forms no part of our present invention and is not shown in detail herein.

The present application relates particularly to the provision of means for withdrawing the lathe tools T and T' from operative position during the work removing and work feeding operations, for quickly returning the tools to operative position after a new piece of work has been inserted, and for feeding the tools into the work with a straight line movement during the continued operation of the machine.

In carrying out our invention, we mount the tools T and T' in tool slides 20 and 21 respectively, which tool slides are mounted in guideways in supporting members 22 and 23.

These supporting members 22 and 23 are secured to the forwardly projecting end portions of shafts 24 and 25 (Fig. 2), supported in bearings in the frame 10. Arms 26 and 27 are mounted on the shafts 24 and 25 respectively and support rolls 28 and 29, positioned for engagement by cams 30 and 31.

The cams 30 and 31 are mounted on a drive shaft 33 which may be continuously rotated by a worm wheel 34, driven from any suitable source of power and making one revolution for each complete cycle of operations of the machine.

As the cams 30 and 31 are single acting and operate only to swing the supports 22 and 23 toward the work, we provide special hydraulic means for yieldingly engaging the rolls with the cams and for swinging the supports 22 and 23 to outward position.

For this purpose, collars 36 and 37 (Fig. 3) are secured on the shafts 24 and 25 and are provided with lugs or projections 38 and 39, engaged by the upper ends of plungers 40 and 41. These plungers are mounted for vertical sliding movement in a sub-casing 43, secured to a cross frame member 44 of the machine. The lower ends of the plungers 40 and 41 are engaged by piston rods 46 and 47, connected to pistons 48 and 49 in fixed cylinders 50 and 51.

A pipe 52 is connected through suitable ports to the lower end to each cylinder and air or hydraulic pressure in a desired amount is thus admitted to the under sides of the pistons 48 and 49.

Consequently the plungers 40 and 41 are continuously pushed upward, tending to swing the tool supports 20 and 23 outward whenever the cams 30 and 31 will permit such movement.

Figure 1:
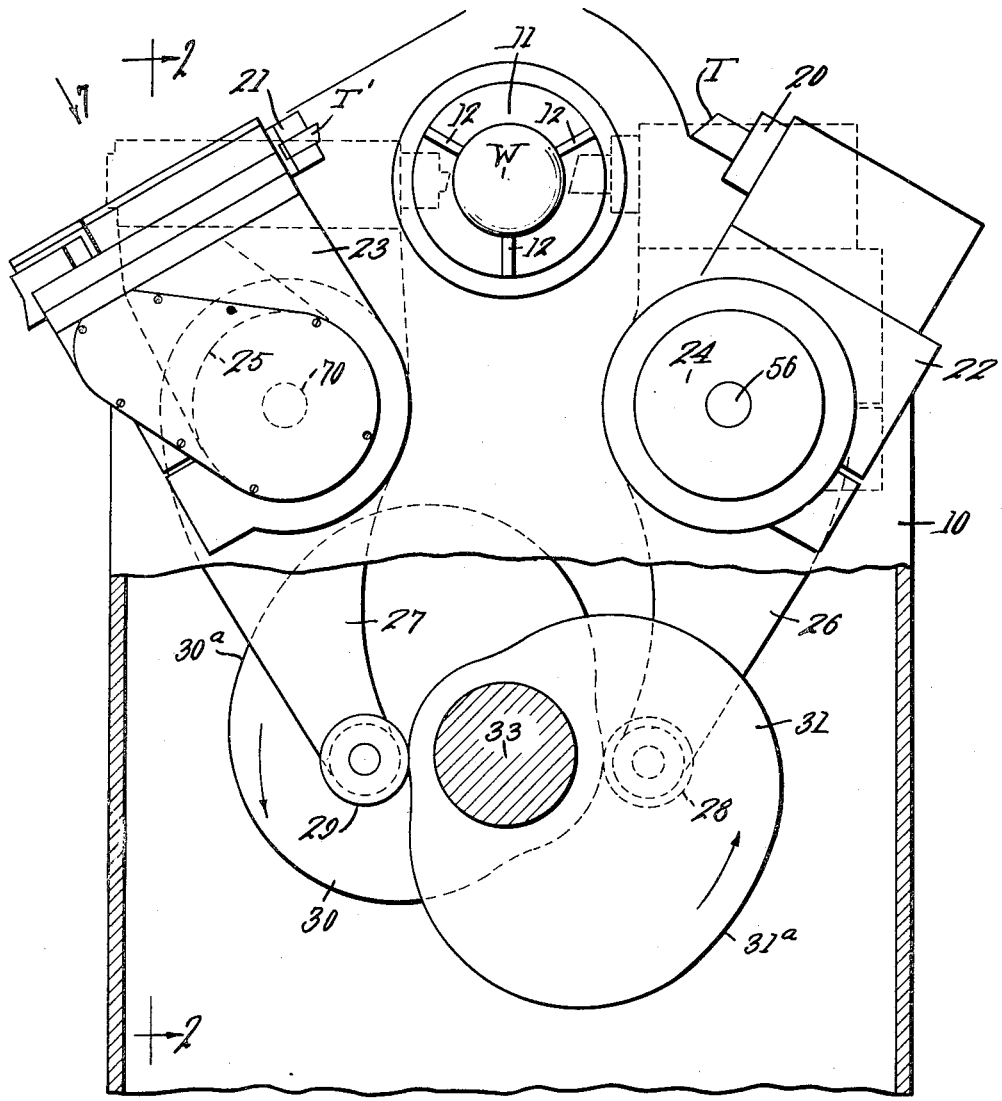
Fig. 1 is an end elevation of parts of a lathe embodying our invention, with the casing broken away and certain parts showing in section.

The cams 30 and 31 are so designed that the supports 22 and 23 will move quickly outward away from operative position as soon as a piece of work is finished, and will as quickly return to operative position as soon as a new piece of work is inserted. The portions 30a and 31a respectively are, however, concentric, so that the supports are held in the fixed position indicated in dotted lines in Fig. 1 during the cutting operations.

We will now describe the mechanism for actuating the rear tool slide 20 and tool T. A shaft 56 is rotatably mounted in bearings within the shaft 24 previously described and is connected to the driving shaft 33 by suitable gearing 57 (Fig. 2) so as to be rotated by said driving shaft at substantially increased speed.

A worm 60 (Fig. 5) is mounted on the shaft 56 and engages a worm wheel 61 mounted on the lower end of an upright shaft 62 (Fig. 4), rotatable in a bearing in the supporting member 22 and having an eccentric pin 64 at its upper end. This eccentric pin is positioned in a transversely extending recess or groove 65 formed in the under side of the tool slide 20 which supports the tool T.

The gear train 57 is so proportioned that the worm wheel 61 and shaft 62 make one revolution for each revolution of the shaft 33 and cams 30 and 31.

As the shaft 62 and eccentric pin 64 rotate, (the support 22 being maintained in inward or operative position) the slide 20 is gradually advanced toward the work, giving the tool T a straight-line feeding movement. After the cut is completed, the support 22 swings outward and the tool T is gradually withdrawn while the tool support is in outward inoperative position. By the time support 22 is again moved inward, the eccentric pin 64 is again positioned to gradually advance the slide 20 and tool T.

One or more tools T may be provided in the slide 20. In Figs. 5 and 6 we have shown tools T adapted to first cut off and square the ends of a piece of work W and to then chamfer the outer corners of the work.

We are thus able to swing the work support 22 rapidly to and from operative position about the axis of the shaft 24, while at the same time we give the tool slide 20 and tool T a straight line feeding movement to cause the tools to operate on the work.

The mechanism for moving the tool slide 21 and tool T' relative to their supporting member 23 differs somewhat in detail from that provided for moving the slide 20 and tool T, and is best shown in Figs. 7-11.

A shaft 70 is rotatably mounted in bearings in the shaft 25 on which the supporting member 23 is mounted. The shaft 70 extends through the rear end of the shaft 25 and is also connected to the driving shaft 33 by suitable gearing for continuous rotation thereby at substantially increased speed.

The shaft 70 is connected by gears 71, 72 and 73 (Fig. 8) to a worm shaft 74, mounted in bearings in the supporting member 23 and provided with a worm 75 which drives a worm wheel 76 rotatably mounted on a hub or bearing member 77 (Fig. 10) secured in the upper portion of the supporting member 23.

The upper part of the worm wheel 76 is formed with a grooved cam portion 80 (Figs. 10 and 11), in which a cam roll 81 is positioned. The roll 81 is mounted on the lower end of a stud 82, extending upward through a slot 83 in the tool slide 21 and secured in position therein by a clamping nut 84.

An adjusting screw 85 is mounted in the slide 21 and is threaded into the shank of the stud 82. By loosening the nut 84 and turning the screw 85, the tool slide 21 and tool T' may be adjusted relative to the actuating cam portion 80.

As the worm gear 76 with its cam portion 80 is slowly rotated, the tool slide will be moved toward and away from the work with a straight line movement, in a manner similar to the movement of the tool slide 21 by the eccentric pin 64. The parts are so timed that the worm gear 76 makes one revolution for each complete revolution of the drive shaft 33.

It is obvious that the tool slide 21 may be moved in any direction by the cam portion 80 and cam roll 81, so long as the line of movement of the slide intersects the axis of the worm gear 76. Consequently we provide the guideways for the slide 21 in an intermediate holder 90 having a stud 91 (Fig. 10) projected downward into an axial recess in the bearing 77 for the worm gear 76.

With this construction, the holder 90 may be moved to an inclined position, as indicated in Fig. 7, and may be secured in any angularly adjusted position by clamping bolts 93. After being thus angularly adjusted, the timing of the worm wheel may be correspondingly adjusted by slipping the intermediate gear 72 (Fig. 8) out of mesh and turning the worm shaft 74 to the desired position.

In Fig. 7 we have shown two supporting members 23 and 23a, each of which supports an angularly movable tool slide 21 or 21a, having tools T' by which the inner edges of the work may be beveled or chamfered, after the ends of the blank have been trimmed off by the tools T.

Figure 10:
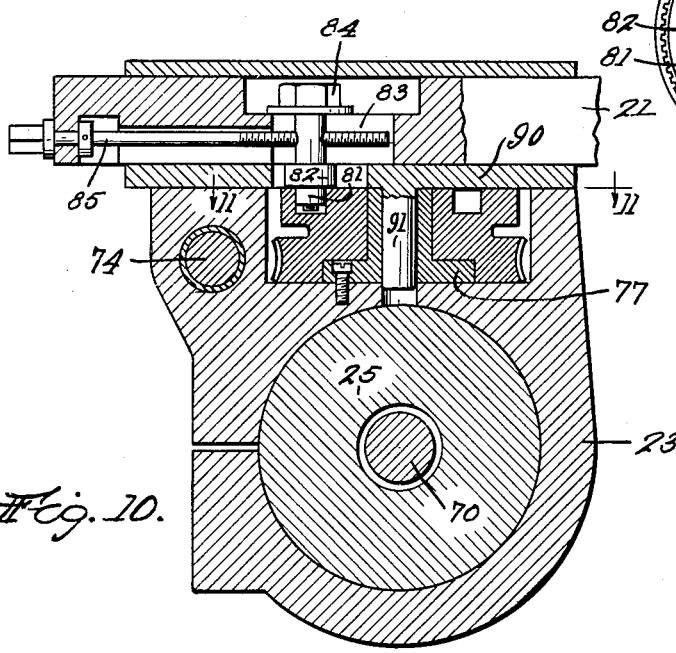
Fig. 10 is a sectional elevation of the front tool slide and driving mechanism, taken along the line 10—10 in Fig. 7.

Each supporting member 23 and 23a is provided with the actuating mechanism shown in Fig. 10, and a separate worm 75 is mounted on the shaft 74 for each supporting member. Preferably the worms 75 are keyed to the shaft 74 but are slidable thereon, so that the supports 23 may be moved axially of the work to any desired position. One or more adjusting screws 100 (Fig. 7) may be provided for thus axially adjusting the tool supports, and the same provision may be made for axially adjusting the support 22 on the shaft 24, the worm 60 being also keyed and slidable.

It will thus appear that the mechanism for operating the front tool slides 21 possessed the advantages previously set forth for the operation of the rear tool slide 20 and also permits the tool slides to be set at any desired angle, so that the tools T' may approach the work at an oblique angle if desired, rather than perpendicular thereto.

Substantial advantages are derived from the use of a straight line feed during the cutting or forming operations of the tools, particularly where a cutting-off operation of considerable depth is necessary. Otherwise the edge of the tool is thrown out of line with the axis of the work when the cutting operation is performed solely by swinging movement of the tool support.

Having thus described our invention and the advantages thereof, we do not wish to be limited to the details herein disclosed, otherwise than as set forth in the claims, but what we claim is:—

1. In a lathe, a supporting member, a shaft on which said supporting member is mounted, positive means to turn said shaft in one direction to advance said member toward the work, fluid-operated means to move said supporting member away from the work, and positive means to give the tool a straight line feeding movement while said support is in advanced position.

2. In a lathe, a supporting member, a shaft on which said supporting member is mounted, positive means to turn said shaft in one direction to advance said member toward the work, fluid-operated means to move said supporting member away from the work, and positive means to give the tool a straight line feeding movement while said support is in advanced position and to return said tool to initial withdrawn position on said support while said support is out of operative position.

3. In a lathe, a supporting member, means to swing said member toward and away from the axis of the work and to hold said member in operative position, a tool slide on said member, a shaft mounted in a bearing in said member and having an eccentric pin engaging a recess in said tool slide, and positive means to rotate said shaft and thereby advance said tool slide while the support is held in operative position.

4. In a lathe, a pivotally mounted tool support, means to swing said support toward the work and to maintain said support in advanced position, means to withdraw said support from the work, means to give the tool a straight line feeding movement on said support during the cutting operation and while said support is at rest, and common automatic driving means for said support-swinging means and said tool-moving means, said common driving means effecting successive movements of said support and tool in predetermined timed relation.

5. In a lathe, a pivotally mounted tool support, cam means to swing said support toward the work and to maintain said support in fixed advanced position, yielding means to withdraw said support from the work, a gear drive effective to give the tool a straight line feeding movement on said support during the cutting operation, said latter movement taking place while said support is maintained in fixed operative position, and common automatic driving means for said support-swinging means and said tool-moving means, said common driving means effecting successive movements of said support and tool in predetermined timed relation.

6. In a lathe, a tool slide, a support for said slide, a shaft on which said support is mounted for axial adjustment, means to rock said shaft to move said tool slide toward and from the work, a second shaft mounted in parallel relation to said first shaft, means to drive said second shaft, a worm keyed to said second shaft and slidable thereon with said support, and driving connections for said tool slide including a worm wheel engaged by said worm and driven by said second shaft.

7. In a lathe, a plurality of lathe tools, tool slides therefor, quick-acting means to withdraw said tools and slides transversely from the work to permit removal and replacement of the work, quick-acting means to advance the tools and slides toward the axis of the work to operative position, means to further advance the tool slides and tools toward the work with a straight line feeding movement while thus maintained in operative position, common automatic driving means for said quick-acting advancing means and said straight line feeding means, said common driving means effecting successive movements of said slides and tools in predetermined timed relation.

8. In a lathe, a plurality of lathe tools, tool slides therefor, quick-acting means to withdraw said tools and slides transversely from the work to permit removal and replacement of the work, quick-acting means to advance the tools and slides to operative position, means to maintain said slides toward the axis of the work in operative position, means to further advance the tool slides and tools toward the work with a straight line feeding movement while thus maintained in operative position, means for varying the angle at which the tool slides and tools approach the work, and means for adjusting the tool-advancing means to establish a desired time relation between the first and second advance movements.

EDWIN R. SMITH.
JUEL L. PETERSON.